United States Patent
Koelle et al.

[11] Patent Number: 5,826,205
[45] Date of Patent: Oct. 20, 1998

[54] REPROGRAMMABLE CONTROLLER CONTAINING MULTIPLE PROGRAMS

[75] Inventors: Ulrich Koelle, Schwieberdingen; Hans-Joerg Schulz, Vaihingen, both of Germany

[73] Assignee: Robert Bosch GmbH, Stuttgart, Germany

[21] Appl. No.: 501,756

[22] Filed: Jul. 12, 1995

[30] Foreign Application Priority Data

Jul. 19, 1994 [DE] Germany .......................... 44 25 388.5

[51] Int. Cl.[6] ................ G06F 9/24; G05B 19/42
[52] U.S. Cl. ............... 701/29; 701/35; 701/102; 701/115; 395/182.21; 395/183.22; 395/430
[58] Field of Search .............. 364/431.04, 431.12, 364/424.034, 424.038, 424.04, 926.9, 949; 395/430, 442, 375, 182.21, 183.22

[56] References Cited

U.S. PATENT DOCUMENTS

| | | | |
|---|---|---|---|
| 4,267,569 | 5/1981 | Baumann et al. | 364/431.01 |
| 4,677,558 | 6/1987 | Böhmler et al. | 364/431.04 |
| 4,751,633 | 6/1988 | Henn et al. | 364/431.12 |
| 4,777,355 | 10/1988 | Takahira | 235/380 |
| 5,053,990 | 10/1991 | Kreifels et al. | 395/430 |
| 5,138,548 | 8/1992 | Kienle | 395/185.61 |
| 5,247,446 | 9/1993 | Motz et al. | 364/431.12 |
| 5,252,812 | 10/1993 | Nakamura | 235/380 |
| 5,276,839 | 1/1994 | Robb et al. | 395/430 |
| 5,278,759 | 1/1994 | Berra et al. | 364/423.098 |
| 5,297,148 | 3/1994 | Harari et al. | 395/182.05 |
| 5,521,588 | 5/1996 | Kühner et al. | 340/825.22 |

OTHER PUBLICATIONS

Bosch Technical Instruction Manual, Motronic Combined Ignitium and Gas–Injection System, 1983 (Month is Not Available).

*Primary Examiner*—Tan Q. Nguyen
*Attorney, Agent, or Firm*—Kenyon & Kenyon

[57] ABSTRACT

A controller has a microcomputer, an electrically erasable and programmable memory which has a control program (CONTROL), a read only memory and a serial interface. A serial data transmission line can be connected to the serial interface. A program (PROG) for reprogramming the electrically erasable and programmable memory is stored in the read only memory. For reprogramming the electrically erasable and programmable memory, the controller receives the data, which are to be programmed, via the serial data transmission line from an external communications apparatus.

7 Claims, 4 Drawing Sheets

REPROGRAMMABLE CONTROLLER CONTAINING MULTIPLE PROGRAMS

BACKGROUND INFORMATION

In order to achieve greater flexibility in the programming of controllers, in particular motor vehicle controllers, it has been found to be advantageous to use electrically erasable and programmable memory chips (flash-EPROMS). These memory chips have the advantage that they allow similarly high storage densities as normal electrically programmable memories (EPROMS) and that, at the same time, they can be electrically programmed and electrically erased in an application circuit. In this case, entire memory blocks in a flash EPROM can be erased all at once. The time for erasing the memory chip is thus considerably reduced from that for conventional EPROM chips.

Flash EPROMS are used to an increasing extent, for the reasons stated, in mass-produced controllers, in particular in motor vehicle controllers. In this case, the flash EPROMS are used as program memories in which the actual control program for the controller is stored. Normally, the controllers additionally have a read only memory (ROM) which contains the program parts which are necessary for the reset process (RESET). That is to say, those program parts which are called up after the switching-on process possibly carry out a test of the controller and subsequently pass control to the control program which is stored in the electrically erasable and programmable memory. Those program parts which make it possible to reprogram the electrically erasable and programmable memory are also stored in the read only memory. This includes in particular a program part which makes it possible to communicate with an externally provided communications apparatus which can be connected via a serial interface and a serial data transmission line. In addition, those program parts which contain the erasing and programming routines for the electrically erasable and programmable memory are also included.

However, these program parts are called up only when the controller identifies during the program execution of its actual control program that an external communications apparatus is connected to the serial interface and that this communications apparatus wishes to communicate with the controller. In the case of this solution, the problem arises that, in the case when the memory contents in the electrically erasable and programmable memory are defective, the control program no longer operates correctly and it is no longer possible to call up the program parts for reprogramming the electrically erasable and programmable memory at all, because the control program itself is no longer operating correctly.

Admittedly, the case when the memory contents of the electrically erasable and programmable memory are defective is extremely rare, but it can occur when entry into the erasing routine for erasing the electrically erasable and programmable memory takes place as a result of random program glitches, and partial erasing of the electrically erasable and programmable memory is then also carried out. It is possible to preclude this case by circuitry measures, but this means an additional high circuit cost which is, however, not always justified as a result of the extremely rare occurrence of such program glitches. The defect situation is also covered to a large extent by software measures. However, without hardware protection, there is always a residual risk of "self-destruction" of the program memory.

In the case described, subsequent reprogramming of the electrically erasable and programmable memory is thus no longer possible and, in the worst case, the controller must be scrapped. The described problem is solved by the measures according to the present invention.

SUMMARY OF THE INVENTION

The controller according to the present invention has the advantage that the programmability of the electrically erasable and programmable memory is always ensured. Even if a defective entry is present in the electrically erasable and programmable memory, the electrically erasable and programmable memory can be reprogrammed. It is furthermore advantageous that the controller need not be removed from the installation location for programming the electrically erasable and programmable memory. It is likewise advantageous that no additional circuit cost is necessary in order to improve the programmability of the electrically erasable and programmable memory.

One solution is particularly advantageous, in which an interrogation is provided in a reset program, which is stored in the read only memory, for the controller, which interrogation checks at least one input of the controller to determine whether one or more specific input signals are present and which, if this is the case, starts the program for reprogramming the electrically erasable and programmable memory. In this way, the reprogramming can be initiated in a simple manner by means of an input signal which is present anyway for normal operation, at the same time as the application of the voltage supply to the controller. The workshop personnel need only take care that the specific input signal is present on the controller.

In an embodiment, the memory requirement for the read only memory can be reduced. Since the erasing and programming routines are subsequently loaded from the external communications apparatus into a volatile memory, the read only memory need store only that program part which makes it possible to exchange data with the external communications apparatus. This reduces the costs for the ROM memory and provides additional safety with respect to EMC interference.

In the case of an engine controller of a motor vehicle which is designed to control an internal combustion engine, it is advantageous if that input to which the throttle valve potentiometer is connected is checked in the reset program to determine whether the input signal for full-load operation is present and, in this case, if the program for reprogramming the electrically erasable and programmable memory is enabled. These measures allow an input option, which is very convenient for the workshop personnel, for initiating the programming process. Specifically, the workshop personnel need only completely depress the gas pedal of the motor vehicle and then switch on the ignition in order to initiate the programming process.

It is furthermore advantageous that, in addition to the interrogation of the throttle valve potentiometer in the reset program, a rotation speed input is checked to determine whether a rotation speed signal is present or not. The initiation of the programming process then takes place only when no rotation speed signal is present. This ensures that the program for reprogramming the electrically erasable and programmable memory is not called up in the case even when the reset program is called up while the motor vehicle is in motion and when the gas pedal is accidentally fully depressed at the same time.

It is furthermore advantageous that, as an additional safety measure, a programming enable code is additionally interrogated by the external communications apparatus before calling up the program for reprogramming the electrically erasable and programmable memory, so that the program for reprogramming is started only when the received programming enable code has been identified as being correct. This largely prevents unauthorized initiation of the programming process.

DETAILED DESCRIPTION

Figure 1:
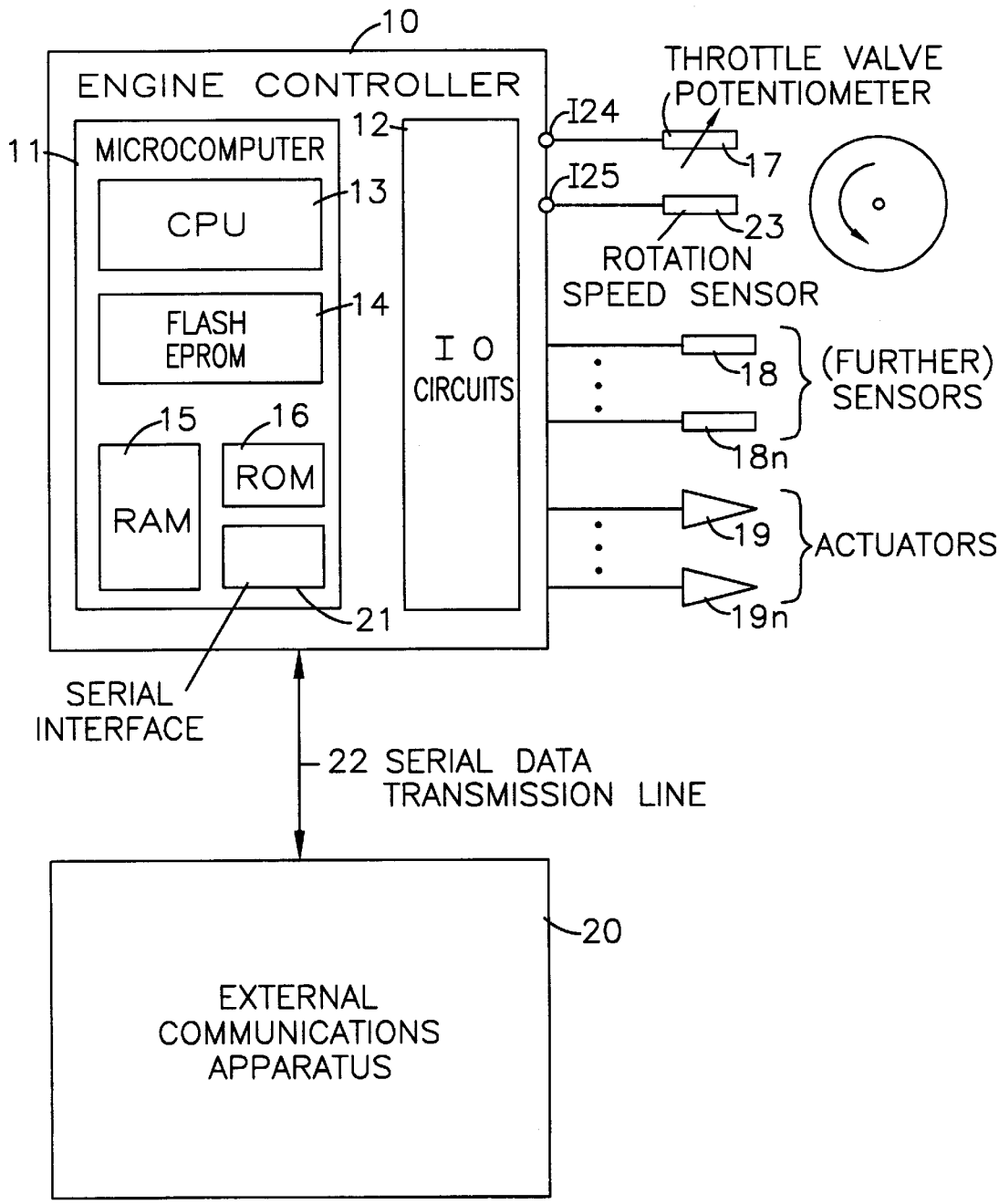
FIG. 1 shows a block diagram of the controller according to the present invention and an external communications apparatus connected to it.

The present invention is explained using the example of an engine controller for controlling the internal combustion engine of a motor vehicle. In FIG. 1, the reference number 10 designates the engine controller. The engine controller 10 contains a microcomputer 11. Furthermore, input/output circuits 12 are provided in the engine controller 10. The microcomputer 11 contains a central processor unit 13, an electrically erasable and programmable memory (flash EPROM) 14, a random access memory 15, a read only memory 16, and a serial interface 21.

A throttle valve potentiometer 17 is connected to the engine controller 10. Furthermore, a rotation speed sensor 23 is connected to the input 25 of the engine controller 10. Further sensors 18n are connected to the engine controller, but these are not explained in more detail. Depending on the engine controller, the sensors 18 to 18n relate to an engine temperature sensor, an induction air temperature sensor, an airflow meter, an idle switch, etc. Furthermore, actuators 19 to 19n are connected to the engine controller 10. These should be understood to include, for example, injection valves and ignition coils. A precise design of the engine controller 10 can be found, for example, in the document Bosch Technical Instruction Manual, Motronic combined ignition and gas-injection system, Robert Bosch GmbH, 1983.

An external communications apparatus 20 is connected to the engine controller 10 via a serial data transmission line 22. The connection to the external communications apparatus is produced, for example, for the programming of the electrically erasable and programmable memory 14 in the workshop and for diagnosis purposes. The case considered here is that in which the driver of the vehicle has detected a defect in his engine controller and has then gone to the nearest specialist workshop. If the vehicle was no longer drivable, a recovery service would have had to be used for this purpose. Those in the specialist workshop determine whether the engine controller 10 can still communicate with the external communications apparatus. If this is the case, a test of the controller 10 is carried out, during which the contents of the electrically erasable and programmable memory 14 are also checked. This is done by forming and checking check sums. It is then found that there is a defect in the memory contents of the electrically erasable and programmable memory. The workshop personnel then attempt to rectify the defect of the controller by subsequent programming of the electrically erasable and programmable memory 14. In the worst case, there was no communication whatsoever with the controller 10 at the start of the check. In this case, the workshop personnel attempt to rectify the defect directly by subsequent programming.

Figure 2:
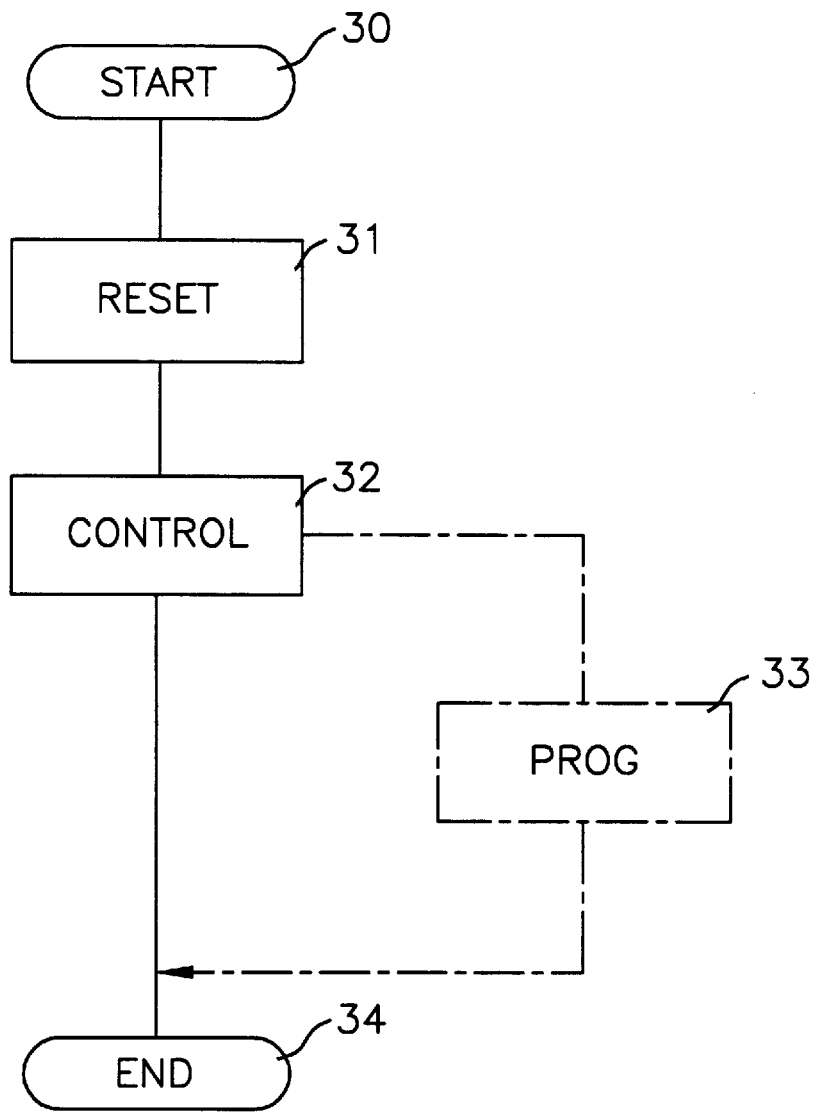
FIG. 2 shows a rough program structure for initiating the reprogramming of the electrically erasable and programmable memory chip.

A rough program sequence which applies to a conventional engine controller is shown in FIG. 2. After the program start 30, the reset program (Reset) is executed in program step 31. The initialization of the engine controller 10 takes place in this step. The actual control program (CONTROL) of the engine controller 10 is called up in the next program step 32. Normally, this program continues to be executed until the ignition is switched off. However, this program can also be interrupted for the purpose of reprogramming the electrically erasable and programmable memory 14. A stimulation process, which causes the engine controller 10 to interrupt its actual control program, takes place for this purpose from the external communications apparatus 20. The program for reprogramming the electrically erasable and programmable memory 14 is then subsequently called up. The branching from the actual control program to the program for reprogramming the electrically erasable and programmable memory 14 is illustrated by dashed lines in FIG. 2 and is designated by the reference number 33. The program end is designated by the reference number 34.

Figure 3:
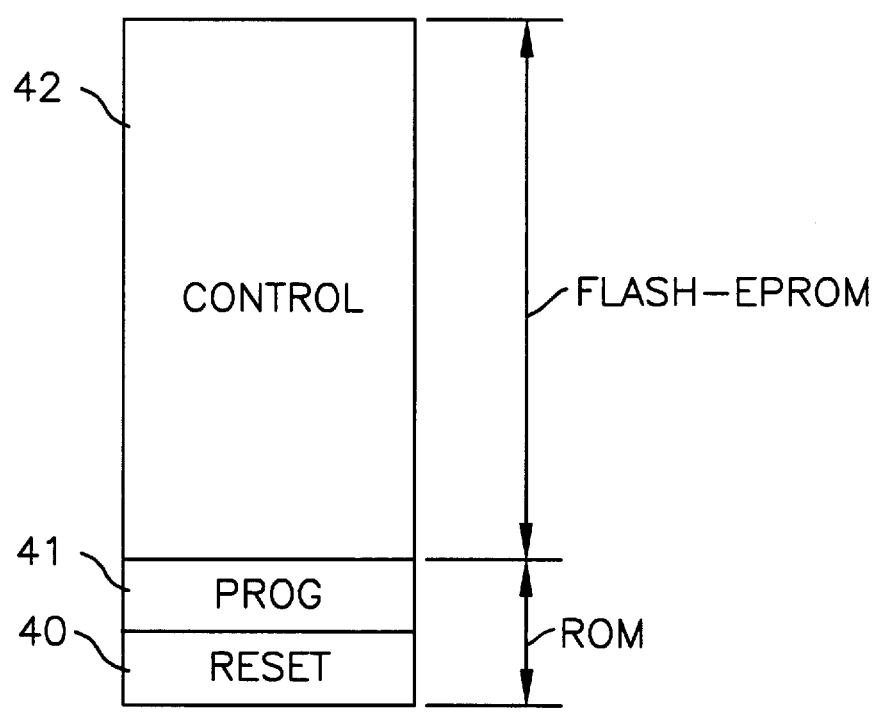
FIG. 3 shows an overview of the memory breakdown of the controller according to the present invention.

The memory breakdown for the controller according to the present invention is illustrated in FIG. 3. That memory area in which the reset program (RESET) is stored is designated by the reference number 40. That memory area in which the program for reprogramming the electrically erasable and programmable memory 14 is stored is designated by the reference number 41. The two memory areas 40 and 41 are contained in the read only memory (ROM). That memory area in which the actual control program (CONTROL) is stored is designated by the reference number 42. As already mentioned, it is contained in the electrically erasable and programmable memory (flash EPROM).

Figure 4:
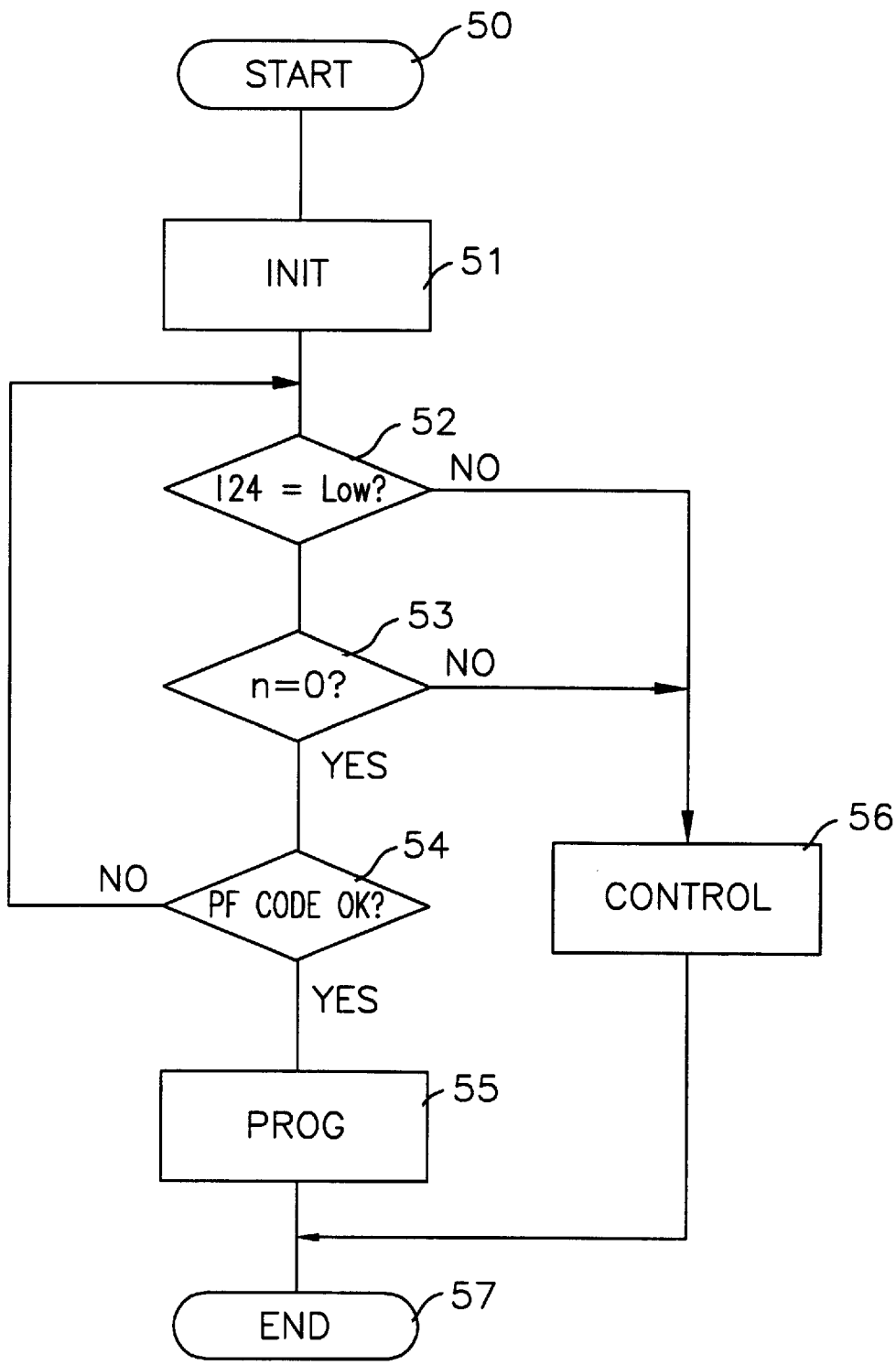
FIG. 4 shows a program structure for initiating the program for reprogramming the electrically erasable and programmable memory in the case of an engine controller according to the present invention.

The program sequence according to the present invention for initiation of the program for reprogramming the electrically erasable and programmable memory 14 (PROG) will now be explained with reference to FIG. 4. A program start is once again designated by the reference number 50. The reset program (RESET) carries out an initialization of the controller directly after the program start 50. This is done in program step 51. Subsequently, a check is carried out in the interrogation 52 to determine whether the throttle valve of the engine is fully open, that is to say the input I24 is checked to determine whether a specific threshold value, which designates full load, has been exceeded. If the full-load threshold value 17 has not been exceeded, the program immediately jumps to the actual control program (CONTROL). The control program (CONTROL) is then called up in program step 56 and continues to be executed until the end.

If it was identified in the interrogation 52 that the full-load threshold value 17 has been exceeded, then the interrogation 53 is subsequently called up. The input I25 is checked in this interrogation 53 to determine whether a rotation speed signal, generated by the rotation speed sensor 23, is present or not. If a rotation speed signal is present, the program once again jumps to the actual control program (CONTROL). If no rotation speed signal is present, the reset program (RESET) jumps to a further interrogation 54. In the interrogation 54, the reset program (RESET) waits until a specific programming enable code is transmitted to the engine controller 10 from the external communications apparatus 20. If the code is not transmitted or is incorrectly transmitted, the program once again continues with the interrogation 52. If the received code corresponds with a code which is stored in the engine controller 10 or a code which is calculated by the engine controller 10, the program (PROG) for reprogramming the electrically erasable and programmable memory 14 (PROGS) is finally called up. This takes place in program step 55. The erasing and programming routines are sufficiently well known to the person skilled in the art, so that they will not be described in more detail in the following text. Once the programming of the electrically erasable and programmable memory has been completed, the program sequence according to FIG. 4 ends in program step 57.

The present invention is not limited to the exemplary embodiment described here. It can always be used expediently whenever a controller contains an electrically erasable and programmable memory chip (flash-EPROM) and an already existing sensor, which can be operated easily, can be interrogated and a special situation can thus be identified. One expedient modification option comprises the storage in the read only memory 16 of only those program parts which make it possible to communicate with the external communications apparatus 20, rather than the complete program for reprogramming the electrically erasable and programmable memory 14. The actual erasing and programming routines can be subsequently loaded from the external communications apparatus 20 into a random access memory (RAM).

A further modification option comprises the program part for memory checking of the electrically erasable and programmable memory being provided in the read only memory (ROM). The check sum can then be formed by corresponding operation of the gas pedal in any case before subsequent programming of the electrically erasable and programmable memory.

What is claimed is:

1. A reprogrammable controller for a device, comprising:
   an electrically erasable and programmable memory having a first program for controlling an operation of the device;
   a read only memory for storing a second program and a third program, the second program for reprogramming the first program in the electrically erasable and programmable memory, and the third program for initiating the first program and the second program;
   a serial interface;
   a serial data transmission line coupled to the serial interface;
   an external communications apparatus coupled to the serial data transmission line for providing data, to be used in reprogramming the first program by the second program, through the serial data transmission line; and
   means for allowing initiation of one of the first program and the second program by the third program, wherein the third program starts program initiation, once the controller has been brought into use, based upon an interrogation which checks at least one input signal of at least one sensor of the object to determine whether a threshold value is present, wherein, when the threshold value is present, the second program controls the controller, and when the threshold value is not present, the first program controls the controller.

2. The reprogrammable controller according to claim 1, wherein the controller is for controlling an internal combustion engine of a motor vehicle.

3. The reprogrammable controller according to claim 1, further comprising a processing unit.

4. The reprogrammable controller according to claim 1, wherein the at least one input signal is coupled to at least one of a throttle valve potentiometer and a full-load switch, and wherein the threshold value is for a full-load operation of the device.

5. A reprogrammable controller for a device, comprising:
   an electrically erasable and programmable memory having a first program for controlling an operation of the device;
   a read only memory for storing a second program and a third program, the second program for reprogramming the first program in the electrically erasable and programmable memory, and the third program for initiating the first program and the second program;
   a serial interface;
   a serial data transmission line coupled to the serial interface;
   an external communications apparatus coupled to the serial data transmission line for providing data, to be used in reprogramming the first program by the second program, through the serial data transmission line; and
   means for allowing initiation of one of the first program and the second program by the third program;
   wherein the second program includes a first part for exchanging data with the external communications apparatus, and a second part for erasing and reprogramming the first program in the electrically erasable and programmable memory, the second part being loaded from the external communications apparatus into a random access memory.

6. A reprogrammable controller for a device, comprising:
   an electrically erasable and programmable memory having a first program for controlling an operation of the device;
   a read only memory for storing a second program and a third program, the second program for reprogramming the first program in the electrically erasable and programmable memory, and the third program for initiating the first program and the second program;
   a serial interface;
   a serial data transmission line coupled to the serial interface;
   an external communications apparatus coupled to the serial data transmission line for providing data, to be used in reprogramming the first program by the second program, through the serial data transmission line; and
   means for allowing initiation of one of the first program and the second program by the third program;
   wherein the third program checks a rotational speed sensor of the object to determine whether a rotational speed signal is present, wherein, when the signal is not present, the second program controls the controller, and when the signal is present, the first program controls the controller.

7. The reprogrammable controller according to claim 1, wherein the third program, checks for a programming enable code received from the external communications apparatus, wherein the second program controls the controller only when the received programming enable code corresponds to a calculated code or a stored code.

* * * * *

UNITED STATES PATENT AND TRADEMARK OFFICE
CERTIFICATE OF CORRECTION

PATENT NO. : 5,826,205

DATED : October 20, 1998

INVENTOR(S) : Ulrich Koelle, Hans-Joerg Schulz

It is certified that error appears in the above-identified patent and that said Letters Patent is hereby corrected as shown below:

Column 3, line 38, "sensors 18n" should be --sensors 18 to 18n--.

Signed and Sealed this

Twenty-seventh Day of July, 1999

Attest:

Q. TODD DICKINSON

*Attesting Officer*      *Acting Commissioner of Patents and Trademarks*